US009277760B2

(12) United States Patent
Splivallo et al.

(10) Patent No.: US 9,277,760 B2
(45) Date of Patent: Mar. 8, 2016

(54) PRODUCTION OF NATURAL TRUFFLE FLAVOURS FROM TRUFFLE MYCELIUM (76) Inventors: Richard Splivallo, Pully (CH); Christophe Maier, Saint-Prex (CH)

( * ) Notice: Subject to any disclaimer, the term of this patent is extended or adjusted under 35 U.S.C. 154(b) by 117 days.

(21) Appl. No.: 13/381,602

(22) PCT Filed: Jun. 25, 2010

(86) PCT No.: PCT/IB2010/052913
§ 371 (c)(1),
(2), (4) Date: Dec. 29, 2011

(87) PCT Pub. No.: WO2011/001349
PCT Pub. Date: Jan. 6, 2011

(65) Prior Publication Data
US 2012/0100255 A1    Apr. 26, 2012

(30) Foreign Application Priority Data
Jul. 3, 2009  (CH) ..................... 1040/09

(51) Int. Cl.
A23L 1/28     (2006.01)
A23L 1/015    (2006.01)
A23L 1/221    (2006.01)
C12N 1/00     (2006.01)

(52) U.S. Cl.
CPC .. A23L 1/221 (2013.01); A23L 1/28 (2013.01)

(58) Field of Classification Search
CPC .................................. A23L 1/28; C12N 1/14
USPC ......................................................... 426/52
See application file for complete search history.

(56) References Cited

U.S. PATENT DOCUMENTS 4,906,487 A * 3/1990 Delmas et al. ............... 426/534

FOREIGN PATENT DOCUMENTS

| EP | 1 034 697 A2 * | 9/2000 | .............. A01G 1/04 |
| FR | 2517180 | 6/1983 | |
| FR | 2601857 | 1/1988 | |
| FR | 2637779 | 4/1990 | |
| JP | 2005 295858 | 10/2005 | |

OTHER PUBLICATIONS

Alvis, Black Truffle Economics Evaluating the Costs and Returns of Establishing and Producing Tuber melanosporum in Williametter Valley, Oregon, submitted to Oregon State University, Thesis, Aug. 9, 2011.*

(Continued)

*Primary Examiner* — Erik Kashnikow
*Assistant Examiner* — Philip DuBois
(74) *Attorney, Agent, or Firm* — Leanne M. Rakers (57) ABSTRACT

The present invention describes a process for the production of natural truffle (*Tuber* ssp.) aromas using cultures of truffle mycelium and the use of at least one aroma precursor to induce the production by truffle mycelium of volatile compounds characteristic of the natural aroma of truffle fruiting bodies. This invention also includes truffle mycelium (*Tuber* ssp.) cultivated according to the process of the invention, aromatized products having the smell and the taste of natural truffle fruiting bodies and extracted from said truffle mycelium, as well as aromatized substrates containing the same aromatized products.

12 Claims, 3 Drawing Sheets (56) References Cited

OTHER PUBLICATIONS

Buzzini et al., Production of volatile organic compounds (YOCs) by yeasts isolated from the ascocarps of black (Tuber melanosporum Vitt.) and white (Tuber mgnataum Pico) truffles, Arch Microbiol 184:187-193 (2005).*

Morte, Biotechnology and Cultivation of Desert Truffles, Mycorrhiza, Springer-Verlag Berlin Heidelberg, 2008.*

International Search Report for PCT/IB2010/052913 dated Oct. 22, 2010.

Splivallo, Richard, et al., Discrimination of truffle fruiting body versus mycelial aromas by stir bar sorptive extraction, *Phytochemistry* 68 (2007) pp. 2584-2598.

* cited by examiner

PRODUCTION OF NATURAL TRUFFLE FLAVOURS FROM TRUFFLE MYCELIUM

CROSS-REFERENCE TO RELATED APPLICATIONS

This application is a National Phase entry of International Application No. PCT/IB2010/052913 filed on 25 Jun. 2010, which claims priority under 35 U.S.C. §§119(a) and 365(b) to CH No. 01040/09 filed on 3 Jul. 2009. The above recited patent applications are incorporated herein by reference in their entirety.

FIELD OF THE INVENTION

The present invention describes a process for the production of natural truffle (*Tuber* ssp.) aromas using cultures of truffle mycelium and the use of at least one aroma precursor to induce the production by truffle mycelium of volatile compounds characteristic of the natural aroma of truffle fruiting bodies. This invention also includes truffle mycelium (*Tuber* ssp.) cultivated according to the process of the invention, aromatized products having the smell and the taste of natural truffle fruiting bodies and extracted from said truffle mycelium, as well as aromatized substrates containing the same aromatized products.

BACKGROUND ART

Truffles (Genus: *Tuber*; Family: *Tuberacea*; Order: Pezizales) are ascomycetes fungi which live in symbiosis (ectomycorrhizae) with oaks, beech, hazels, etc. Among the 60 species that exist, only a limited number of species are praised for their aroma and for their taste, including the black Périgord truffle (*Tuber melanosporum*), the White Piedmont truffle (*Tuber magnatum*); the summer truffle (*Tuber asetivum*), another black truffle (*Tuber brumale*) and the "small white Italian truffle" (*Tuber borchii*). The world production is in constant decline: about 1000 tons of truffles were produced at the beginning of the 19$^{th}$ century, but only 80 to 150 tons are produced nowadays.

For more than 50 years, humans have been planting trees which roots had been inoculated with truffles. Less than 5% of these trees produce truffles and this usually only after 5-10 years due to the poor understanding that human have of truffle biology.

Truffle aroma is made up of about 50 volatiles, which are hydrocarbons containing alcohol, ketone, aldehyde and ester functional groups and also sulfur atoms. Different truffle species have a distinct aroma from each other because they produce species specific volatile compounds. Some volatiles are also common to all truffle species; however they are produced by each species in specific quantities. Taken separately none of these volatile compounds smells like truffle fruiting bodies, however once the right compounds are mixed in the right proportions, the mixture reproduces the aroma of truffle fruiting bodies.

Nowadays truffle aromas can be obtained using truffle fruiting bodies and trapping their aroma into a solid substrate (i.e. rice, some cheeses or liver such as the French "foie gras") or a liquid substrate (oils, creams) by extraction or maceration. Another way to obtain black truffle aroma is to use synthetic truffle aromas basically composed of dimethylsulfide and 2-methylbutanal according to the French Patent FR 86 10871 A1 (Delmas, Institut National Polytechnique de Toulouse) or composed of dimethylsulfide and methylethylketone (also known as 2-butanone) according to the Italian Patent IT 1215936B (SENTOSA S. A. S MILANO).

The use of the synthetic compounds in specific proportions described in the French and Italian patents mentioned in the previous paragraph do not permit, according to the European legislation, to use the label "natural truffle aroma" for products that contain those synthetic mixtures. The invention described herewith specifically permits to obtain such a "natural aroma" of white or black truffle, since the aroma compounds are directly derived from truffle mycelium.

Additionally, since the creation of synthetic truffle aromas, international experts agree that synthetic truffle aromas does not have the complexity and nuances of natural truffle aromas, simply because synthetic aromas only contains a limited number of molecules (2 to 5 in total) compared to natural aromas that contains much more constituents (more than 20 volatiles). Furthermore the production costs of natural truffle aromas keeps on rising due to the decline observed in the worldwide production of truffle fruiting bodies (Fauconnet and Delher 1998; Hall and Yun 2001).

Furthermore the aroma analysis performed so far on the truffle mycelium of *Tuber borchii* (the "small white Italian truffle") showed that even though many aroma molecules are spontaneously produced by the mycelium, they do neither reproduce the smell nor the complexity of fresh truffles (Tirillini et al., 2000; Splivallo et al., 2007). Additionally, the American company Truffle International which produces truffle mycelium in hydroponic cultures acknowledges that the taste and aroma of their products clearly differs from the one of truffle fruiting bodies, mostly due to a very low concentration of sulfur containing volatiles (Fields, 2007; see also the web site of the company <<Truffles International>> http://www.trufflesinternational.com/truffle_science.html).

It should be stressed that most culture media used so far to grow truffle mycelium contained low concentrations of amino acids (traces), simply because these culture media are themselves derived from plants (i.e. the potato extract "potato dextrose broth" used in Splivallo et al., <<Discrimination of truffle fruiting body versus mycelial aromas by stir bar sorptive extraction>>, Phytochemistry (Amsterdam) October 2007, Vol. 6668, No. 20, pp 2584-2598). Amino acids are as a matter of fact often used in microbiology to favor the growth of microorganisms. In the case of truffle mycelium, a low concentration of amino acids (traces) is however not sufficient to induce the production volatiles characteristic of the aroma of truffle fruiting bodies.

The patent JP 2005295858 also recommends using amino acids to favor nitrogen uptake by black truffle mycelium thus inducing its growth. The authors of the latter patent however admit that truffle mycelium obtained in such a way does not smell like truffle fruiting bodies, and even recommend drying the mycelium to facilitate its handling/marketability of their product (which surely results in the loss of any aroma compound).

In summary, the invention described in the present patent allows to induce the production of volatile compounds in a targeted manner and as a whole obtain a mixture of volatiles which are characteristic of the natural aroma of truffle fruiting bodies (sulfur containing volatiles and other key volatiles of truffle aroma).

Considering that synthetic truffle aroma is poorly accepted by consumers, and considering the very high prices reached by natural truffle aroma obtained from fruiting bodies, the present invention also offers a solution to the market by defining an alternative and cheaper process to obtain natural truffle aromas. The present invention also permits to reduce overharvesting of truffles in the wild, thus decreasing the ecological pressure on the fungus.

BRIEF DESCRIPTION OF THE INVENTION

The present invention describes a process for the production of natural truffle aromas (*Tuber* ssp.) from cultivated truffle mycelium, comprising at least one aroma precursor supplemented to the culture medium of said truffle mycelium thus resulting in the characteristic aromas of truffle fruiting body, and characterized in that said aroma precursor is selected among the natural or synthetic amino acids of L-methionine, leucine, isoleucine, valine, phenylalanine and/or their mixtures, their precursors and/or their degradation products, and wherein said aroma precursor supplemented to said truffle mycelium culture medium is present in large excess either higher or equal to a concentration of 10 mM.

The invention also relates to the use of at least one aroma precursor to induce in cultivated truffle mycelium the production of the volatile compounds characteristic of natural truffle (*Tuber* ssp.) fruiting bodies.

Another scope of the invention also concerns the truffle mycelium (*Tuber* ssp.) cultivated according to the process described in the present invention, aromatized products extracted from said truffle mycelium and that have the smell and the taste of natural truffles, and other substrates containing these aromas.

As demonstrated by the experimental results (Examples 1 and 2), culture medium made of malt extract (as described in Splivallo et al. 2007) contain for example natural concentrations of amino acids that are 130 to 400 times lower that the concentrations used in the present invention which induce key components of truffle aroma (for the natural concentrations of amino acids in malt extract refer to page 1648 of the publication by Flückiger-Isler et al., 1993, The Journal of Nutrition).

The present invention covers the use of specific amino acids in large excess, which scope is not to induce mycelial growth since very high concentrations of amino acids might result in growth inhibition, but in the contrary to surprisingly and specifically stimulate the production of key compounds of truffle aroma.

DETAILED DESCRIPTION OF THE INVENTION

One object of the present invention is to describe a process for the production of natural truffle aromas (*Tuber* ssp.). This process employs truffle mycelium in pure culture and bases itself on the transformation by the mycelium of aroma precursors in order to obtain the volatiles which are characteristic of white and black truffle fruiting bodies.

Specifically the process for the production of natural truffle aromas from truffle mycelial cultures described in the present invention comprises at least one aroma precursor supplemented to the culture medium of the said truffle mycelium, thus resulting in the characteristic aroma of truffle fruiting bodies. The said aroma precursor is preferentially selected among the natural or synthetic amino acids of L-methionine, leucine, isoleucine, valine, phenylalanine and/or their mixtures, their aroma precursors and/or their degradation products. The said aroma precursor supplemented to the culture medium of the said truffle mycelium is present in large excess either higher or equal to a concentration of 10 mM.

A natural aroma is of animal, vegetal or fungal origin. It is exclusively obtained by physical, microbiological or enzymatic methods from an animal, vegetal or fungal substrate (obviously not genetically modified) (http://dictionnaire.sensagent.com/ar%C3%B4me/fr-fr/). Natural truffle aromas are made up of hydrocarbons containing alcohol, ketone, aldehyde, ester groups as well as sulfur atoms.

An amino acid is an organic molecule formed by a carbon based backbone and two functional groups: one amine (—NH2) and one carboxylic acid (—COOH). Amino acids are the functional units that make up proteins. They measure about 100 picometers (pm).

More than 100 amino acids are found in nature. Foodstuffs contain amino acids mostly in the form of proteins. A wide variety of amino acids exist, however only 20 are used for protein synthesis in living organisms. The uptake by humans of 9 out of 20 of these amino acids is obligatory because the human body cannot synthesize them. The uptake of 6 other amino acids is "conditionally" obligatory because their endogenous synthesis in the human body is not always sufficient to cover the body requirements.

Natural amino acids include Alanine (Ala), Arginine (Arg), Asparagine (Asn), Aspartate or aspartic acid (Asp), Cysteine (Cys), Glutamate or glutamic acid (Glu), Glutamine (Gln), Glycine (Gly), Histidine (His), Isoleucine (Ile), Leucine (Leu), Lysine (Lys), Methionine (Met), Phenylalanine (Phe), Proline (Pro), Serine (Ser), Threonine (Thr), Tryptophane (Trp), Tyrosine (Tyr) and Valine (Val).

By opposition to the natural amino acids, the carbonated backbone of synthetic amino acids cannot be found in nature. It is for example derived from organic synthesis.

The precursors of amino acids are derived from metabolic pathways such as the glycolysis, the tricarboxylic acid cycle or the pentose phosphate pathway. More specifically these precursors include α-ketoglutarate, 3-phosphoglycerate, oxaloacetate, pyruvate, phosphoenolpyruvate and erythrose 4-phosphate, ribose 5-phosphate and all other metabolites which are upstream or downstream in the metabolic pathway leading to these precursors.

"Degradation products of amino acids": amino acids may undergo a first degradation which removes the α-amino group either by transamination or by oxidation. The ammonium ion is either recycled to form another amino acid or eliminated. The carbonated backbone obtained after the loss of the α-amino group can either be recycled to re-synthesize the corresponding amino acid, or serve as a precursor in the carbohydrates biosynthesis (such as the glycol-forming amino acids), or can also be converted in acetyl-CoA for the synthesis of fatty acids (such as the keto-forming fatty acids).

Preferably, the process for the production of natural truffle aromas according to the present invention bases itself on culturing truffle mycelium in a medium which have been supplemented with amino acids selected among aliphatic, aromatic and sulfur containing amino acids or their mixtures.

Preferably these amino acids are selected among L-methionine, leucine, isoleucine, valine, phenylalanine and/or their mixture. As a matter of fact the inventive aspect of the process resides in using aroma precursors (L-methionine, leucine, isoleucine, valine, phenylalanine and/or their mixtures, their precursors and/or their degradation products) to induce the production of volatiles compounds characteristic of truffle fruiting body aroma. A high dosage of these amino acids forces the truffle mycelium to catabolise these amino acids which in turn results in a higher concentration of target truffle volatiles. According to the invention described herewith, the aroma precursor supplemented to said truffle mycelium culture medium is present in large excess, preferably at a concentration higher or equal to 10 mM.

By "large excess" it is understood that the said aroma precursor is present at a concentration that is at least 20 times, preferably 100 times higher than the concentrations of malt extract (Splivallo et al. 2007) which contain low concentrations of Leucine (0.4 mM), of isoleucine (0.2 mM) or of methionine (0.1 mM) (see Flückiger-Isler et al., 1993). Thus the naturally occurring amino acids concentrations in malt extract are 130 to 400 times lower than the concentrations used in the present invention to induce key truffle volatiles. The results presented herewith are indeed unexpected and surprising (see for example Table 1).

Ideally the said aroma precursor supplementing the said mycelial culture medium is present in the medium at a concentration from 5 to 1000 mM, preferably in large excess higher or equal to 10 mM, beneficially at a dosage between 10 and 1000 mM, even preferably between 10 and 500 mM, and most preferentially from 50 to 500 mM.

Specifically in the case of L-methionine or of valine supplementing the said truffle mycelial culture medium, the dosage used is preferentially higher or equal to 50 mM.

In the case of leucine or of isoleucine supplementing the culture medium, the dosage used is preferentially higher or equal to 100 mM.

In the case of phenylalanine or of 2-oxo-4-methylthiobutyric acid (degradation product of L-methionine) supplementing the said culture medium, the dosage used is preferably higher or equal to 10 mM.

Beneficially the amino acids are selected among L-methionine, isoleucine, their precursors, their degradation products and/or their mixture.

According to a preferred embodiment of the invention, the cultivated truffle mycelium belongs at least to one of the following species: *Tuber melanosporum, Tuber magnatum, Tuber aestivum, Tuber uncinatum, Tuber brumale, Tuber borchii, Tuber mesentericum*, or *Tuber indicum* and/or their mixtures.

Additionally the culture of truffle mycelium may also contain bacteria and/or yeasts which are naturally associated with the truffle fruiting bodies. Supplementing these symbionts to the culture medium will permit improving the yield and the production of the target volatiles. The bacterial population hosted by fruiting bodies and by the mycelium of white truffles (*Tuber magnatum* and *Tuber borchii*) have been described by Barbieri et al. (<<Phylogenetic Characterization and In Situ Detection of a *Cytophaga-Flexibacter-Bacteroides* Phylogroup Bacterium in *Tuber borchii* Vittad. Ectomycorrhizal Mycelium>> Applied and Environmental Microbiology, November 2000, Vol. 66, No. 11, p. 5035-5042; "New evidence for bacterial diversity in the ascoma of the ectomycorrhizal fungus *Tuber borchii* Vittad.>FEMS Mircobiology Letters 247 (2005) 23-25; and <<Occurrence and diversity of bacterial communities in *Tuber magnatum* during truffle maturation>> Environmental Microbiology (2007) 9(9), 2234-2246.). The full content of these documents is incorporated herein by reference in its entirety. These bacteria include the alpha-Proteobacteria such as the group Sinorhizobium/Ensifer with the species *Rhizobium* and *Bradyrhizobium*, the beta-Proteobacteria, the gamma-Proteobacteria, the Bacteroidetes, the Firmicutes, the Actinobacteria as well as the strains of *Pseudomonas* in which the bacteria are able to form spores such as the species of *Micrococcus, Moraxella, Corynebacterium* and *Staphylococcus*. The truffle aroma is predominantly produced by the truffle mycelium, however the host-bacteria and host-microbes which are contained/associated with truffle fruiting bodies may also be involved in the production of volatile compounds of interest.

According to the process of the invention, truffle mycelial cultures supplemented with at least one aroma precursor may be kept for at least 7 days at a temperature between 10 and 30° C. However truffle mycelial cultures supplemented with at least one aroma precursor can also be kept for 1 month or 2 months or even longer at a temperature preferably comprised between 15 and 20° C.

The natural truffle aroma obtained according to the invention described herewith is a volatile molecule which included dimethylsulfide, dimethyldisulfide, 2-methylbutanal, 2-methylpropanal, 3-methylbutanal, 2-phenylethanol, 2,4-dithiapentane, 1-octen-3-ol, 3-octanone, their oxidized or reduced counterparts and/or their mixtures.

According to a preferred embodiment of the invention, the aroma precursor supplemented to said truffle mycelial culture may also contain linoleic acid which brings a slight fungal note to the truffle aroma.

The present invention also contemplates the use of at least one aroma precursor to induce the production by cultivated truffle mycelium of volatile compounds which are characteristic of natural truffle fruiting body aroma. The said aroma precursor is preferably selected among the natural or synthetic amino acids of L-methionine, leucine, isoleucine, valine, plehylalanine and/or their mixture, their precursors and/or their degradation products and the said precursor is supplemented to said truffle mycelium culture medium in large excess either higher or equal to a concentration of 10 mM.

Preferably, the said aroma precursor supplemented to said culture medium of the truffle mycelium is present at a concentration comprised between 10 and 1000 mM, and more preferably between 10 and 500 mM or at the specific concentration for each amino acid as described above for the production of natural truffle (*Tuber* ssp.) aromas from cultivated truffle mycelium.

Even more preferably, the amino acids are selected among L-methionine and isoleucine, their precursors, their degradation products and/or their mixtures.

Another object of the invention consists in using cultures of truffle mycelium in combination with bacteria and/or yeasts naturally present in truffle fruiting bodies to generate the volatile compounds characteristic of truffle aromas. Truffle mycelia in combination with bacteria and/or yeasts naturally present in truffle fruiting bodies are cultivated according to the process of the present invention. The bacteria and/or yeasts naturally present in truffle fruiting bodies are described above.

Cultivated truffle mycelium belonging to at least one of the following species will be preferred for this invention: *Tuber melanosporum, Tuber magnatum, Tuber aestivum, Tuber uncinatum, Tuber brumale, Tuber borchii, Tuber mesentericum*, or *Tuber indicum* and/or their mixtures.

A further object of the present invention is to produce/supply truffle mycelium (*Tuber* ssp.) which has the aroma characteristic of truffle fruiting bodies and which has been cultivated according to the process of the invention. For this purpose, the cultivated truffle mycelium belongs preferably to at least one of the following species *Tuber melanosporum*, *Tuber magnatum*, *Tuber aestivum*, *Tuber uncinatum*, *Tuber brumale*, *Tuber borchii*, *Tuber mesentericum*, or *Tuber indicum* and/or their mixtures.

According to a preferred embodiment of the invention, the culture media of the truffle mycelium may further contain bacteria and/or yeasts naturally occurring in truffle fruiting bodies (as described above) of said truffle species used in this invention.

One of the main object of the invention is also to produce a stable aromatized product with the smell, taste and flavor of fresh truffles, which can also be used for industrial processes without quality loss and which can be supplied all year round. It is also essential to supply an aromatized product with high quality to satisfy connoisseurs and professionals. The aromatized products with natural truffle taste and aroma contains concentrated volatiles which have been obtained from truffle mycelium according to the invention described herewith.

The aromatized product obtained through the process of the invention can be produced as a concentrate by mixing directly the constituents in the right proportions. However to allow a direct and easy use of the product, these constituents are preferably diluted in a solvent appropriate for food products or in a non-toxic liquid substrate with high volatility which further permits to introduce these volatile substances in homogenous or heterogeneous matrices.

Particular solvents such as oil which is appropriate for human consumption can also be used to obtain an aromatic product which can be directly used by consumers to perfume foodstuff. Volatile matrices such as nitrous oxide or trichlorofluoromethane can also be used to impregnate solid matrices according to industrial processes.

In the most common application as foodstuff, the mass ratio of the matrix to the volatile constituents is beneficially comprised between 100 and 10 000.

One of the objects of the present invention is to supply an aromatized product which releases the natural aroma of truffle fruiting bodies, and which is made of a solid or liquid matrix that contains the target volatile compounds obtained according to the invention.

This aromatized substrate can be diluted in a solvent appropriate for foodstuff or in a liquid matrix with high volatility. The dilution in that solvent or liquid matrix is obtained by a mass/mass dilution comprised between 100 and 10 000.

The aromatized substrate obtained according to the invention can further be used to produce foodstuff and/or a product for the aroma industry.

The natural truffle aroma obtained according to the invention described herewith is a volatile molecule which included dimethylsulfide, dimethyldisulfide, 2-methylbutanal, 2-methylpropanal, 3-methylbutanal, 2-phenylethanol, 2,4-dithiapentane (also known as (bismethylthio)methane), 1-octen-3-ol, 3-octanone, their oxidized or reduced counterparts and/or their mixture.

Surprisingly by growing truffle mycelium in culture medium supplemented with the amino acid L-methionine, sulfur containing volatiles characteristic of truffle aroma such as dimethylsulfide and dimethyldisulfide are obtained. Similarly supplementing the culture medium with the amino acid isoleucine induces in the mycelium the production of the volatile 2-methylbutanal.

Using the two aroma precursors L-methionine and isoleucine permits to obtain the volatile compounds which are the basis of truffle aroma. Additionally, using other amino acids such as leucine, valine, phenylalanine permits to induce the production of other volatile compounds (2-methylpropanal and of 3-methylbutanol and of 2-phenylethanol) which, when combined with dimethylsulfide, dimethyldisulfide and 2-methylbutanal improve the quality and complexity of the truffle aroma. The volatile compounds obtained in such a way can be combined in different proportions in order to reproduce a natural aroma of white or black truffle. The invention also comprises the use of such an aromatized product to confer truffle aroma to solid and liquid matrices essentially used by the food and aroma industries Those skilled in the art will appreciate that the invention described herein is susceptible to variations and modifications other than those specifically described. It is to be understood that the invention includes all such variations and modifications without departing from the spirit or essential characteristics thereof. The invention also includes all of the steps, features, compositions and compounds referred to or indicated in this specification, individually or collectively, and any and all combinations or any two or more of said steps or features.

The present disclosure is therefore to be considered as in all aspects illustrated and not restrictive, the scope of the invention being indicated by the appended claims, and all changes which come within the meaning and range of equivalency are intended to be embraced therein. Various references are cited throughout this Specification, each of which is incorporated herein by reference in its entirety.

The foregoing description will be more fully understood with reference to the following Examples. Such Examples, are, however, exemplary of methods of practicing the present invention and are not intended to limit the scope of the invention.

EXAMPLE 1

Mycelium of white truffles (for example *Tuber borchii* ou *Tuber magnatum*) or black truffles (for example *Tuber melanosporum*) is at a first stage grown under sterile conditions and in Petri dishes in a culture medium favoring its growth (for example a solidified medium containing agar (10 g/l) supplemented with malt extract (1%) or Potato Dextrose Agar (15 g/l), with a pH adjusted to 6-5-7.0. Cultivation lasts till the mycelial colony diameter reaches 1-2 cm (some weeks or months depending on the truffle species).

At this stage mycelium originating from the colony edge (for example 0.2 $cm^2$) is transferred in a liquid culture medium such as malt extract at 1.5%, pH 6.5-7.0. The culture medium is either used as it is or is supplemented with methionine (final concentration of the order of 50 mM) in order to compare the aroma of the mycelium growing on pure malt extract to the one of the mycelium growing on malt extract supplemented with methionine. The truffle mycelial culture must be enclosed in an air tight container to make sure that no volatile compounds are lost during the growth of the mycelium.

After one month of growth at 15-20° C. in a container of 20 ml, the volatile compounds induced by the aroma precursors can be detected by the human nose and display the characteristics of the key volatiles of truffles such as sulfur containing compounds. The smell of the mycelial cultures of white and black truffles growing on malt extract which has not been supplemented with methionine are essentially similar to the aroma of malt extract, with also a slight fungal note (Champignon de Paris), however with no similarity whatsoever to the aroma of truffles. In the contrary, regarding the mycelium of white and black truffle supplemented with methionine, the human nose can detect aromas associated to sulfurous fermentation with an aroma of cabbage (black truffle) and with a slight touch of rotten egg (white truffle).

Figure 1:
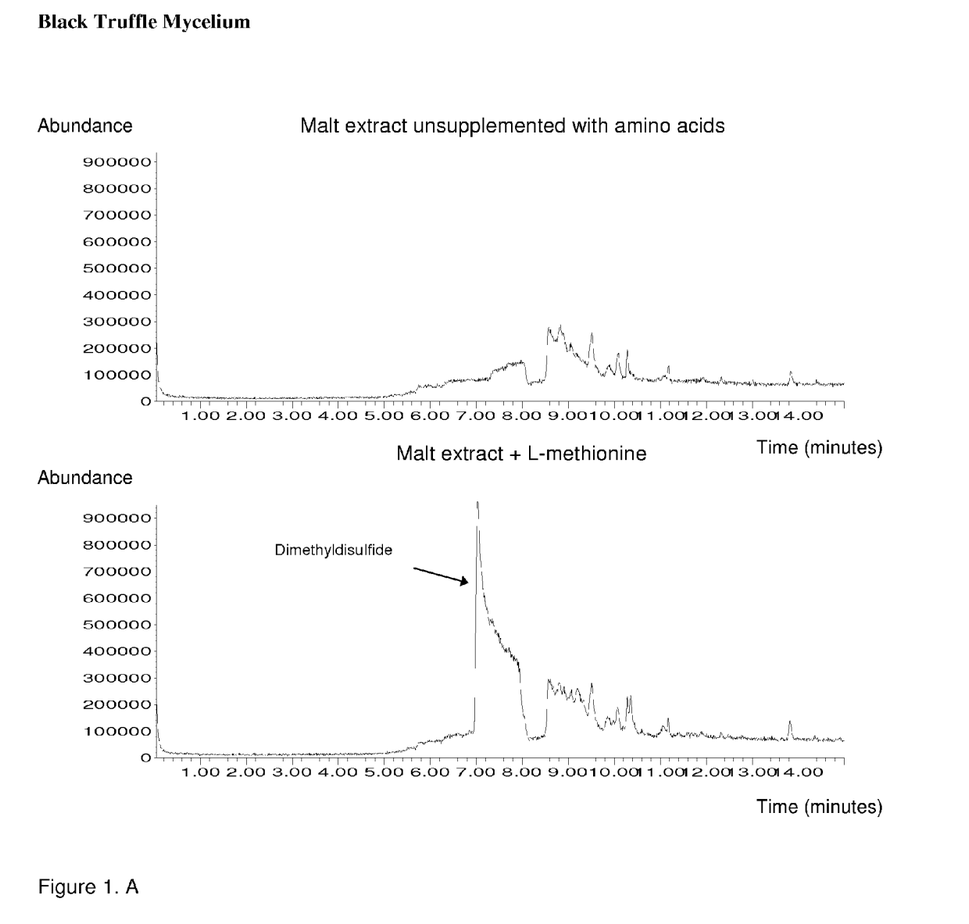
FIGS. 1A and 1B: Chromatograms of the headspace of the white and black truffle mycelium cultures which have been supplemented with L-methionine. Unsupplemented malt extract naturally contains low concentrations of L-methionine (0.1 mM—Fückiger-Isler et al., 1993). An excess of 50 mM of the latter amino acid induces the production of sulfur compounds characteristic of truffle aroma.

Analysis by Gas Chromatography and Mass Spectrometry (GC/MS) confirm the organoleptic results described in the previous paragraph (FIGS. 1A and 1B). Indeed the addition of methionine (50 mM final concentration) induces in the black truffle a strong production of dimethyldisulfide, a volatile compound with a characteristic cabbage aroma. The same amino acid induces in white truffle the production of dimethyldisulfide but also of dimethyltrisulfide (volatile compound with a characteristic smell of rotten egg).

EXAMPLE 2

The mycelium of whit truffles is at a first stage cultivated under sterile conditions in Petri dishes on a medium favoring its growth (for example a solidified medium containing agar (10 g/l) and supplemented with malt extract (1%) or Potato Dextrose Agar (15 g/l), with a pH adjusted to 6-5-7.0. Cultivation lasts till the mycelial colony diameter reaches 1-2 cm.

The colonies are transferred in liquid medium (50 ml in a 250 ml Erlenmeyer) and homogenized with a sterile blender. The mycelium is then cultivated at 23° C. and under mixing (130 rotations per minute, rpm) till an important biomass is obtained (~10 grams of mycelium per Erlenmeyer). From there 2-3 grams of mycelium are transferred in a small air tight container supplemented or not with leucine or isoleucine (60 mM final concentration in malt extract at 1%). After 3 weeks the organoleptic tests are done in parallel to the chromatography analysis by GC/MS (Gas Chromatography and Mass Spectrometry).

Figure 2:
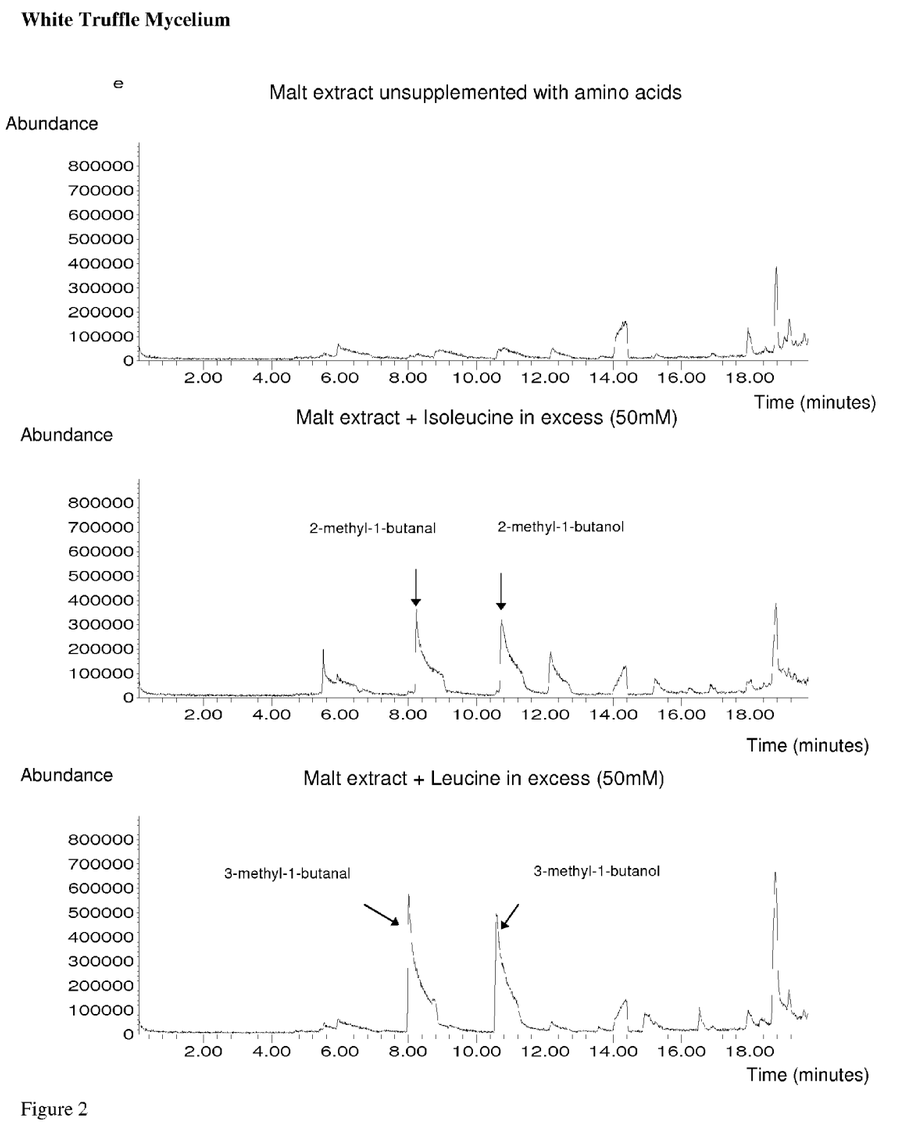
FIG. 2: Chromatograms of the headspace of the white truffle mycelium cultures which have been supplemented with leucine and isoleucine. Unsupplemented malt extract naturally contains low concentrations of leucine (0.4 mM) and of isoleucine (0.2 mM) Fückiger-Isler et al., 1993). An excess of 50 mM of the latter two amino acids induces the production of key compounds characteristic of truffle aroma.

To the nose, the mycelium growing on the malt extract which has not been supplemented with any amino acids has a slight smell of "Champignon de Paris". The mycelium growing on malt extract supplemented with isoleucine produces a complex aroma of chocolate and exotic fruits (characteristic of the production of 2-methylbutanal and 2-methylbutanol—see FIG. 2). Concerning the mycelium growing with leucine, it produces a slight smell of smoked whisky, which indicates the presence of 3-methylbutanal and 3-methylbutanol—FIG. 2).

The volatile compounds obtained in such a way can then be extracted and combined together (for example with the sulfur containing compounds of the first example) in proportions reproducing the aroma of truffles. Alternatively the mycelium can be also used directly to prepare aromatic products and/or foodstuff.

EXAMPLE 3

The mycelium of black truffles (for example *T. melanosporum, T. brumale* or *T. indicum*) is cultivated according to one of the processes described under Examples 1 or 2, with the culture medium supplemented with amino acids (L-methionine, isoleucine, leucine, valine, phenylalanine) at a final concentration of 100 mM.

After 2 months of culture, the volatile compounds are extracted into an appropriate matrix (for example olive oil or cream) and combined together between each other to get an aroma of black truffle. For example, a truffle extract containing an important proportion of sulfur compounds has an aroma similar to the black Périgord truffle (*T. melanosporum*) while a much lower proportion of sulfur compounds results in a less intense aroma similar to the Chinese truffle *Tuber indicum*.

The product obtained in the way described above can further be improved by growing the mycelium with other aroma precursors such as linoleic acid which induces for example the production of 1-octen-3-ol, a volatile compound with a characteristic smell of "Champignon de Paris". In addition to the volatile compounds described above, the aromatic bouquet obtained with the addition of 1-octen-3-ol reproduces the smell of the "small white Italian truffle" *Tuber borchii*.

EXAMPLE 4

The mycelium of black or white truffle is cultivated for 2 months as described in the example 2 and supplemented with L-methionine, isoleucine, leucine, valine, phenylalanine at a concentration of 80 mM, until an important biomass in reached. During these 2 months of culture, the volatile compounds are continually extracted from the mycelial cultures and trapped in a liquid matrix (vegetal oil). After 2 months of culture, the mycelium supplemented with methionine is transferred (without the liquid medium) in an air tight and sterile container and is then inoculated with bacteria and yeasts that have been originally isolated from fruiting bodies of white truffles (*T. magnatum*). After 2 weeks of culture, the volatiles are collected in the same liquid matrix that has been used previously. This extract has a characteristic aroma to the nose of sulfur, stringent and with a strong aroma of cabbage and garlic. Mixed with other mycelial volatiles in the correct proportions, the aroma obtained in such a way resembles the one of the white Alba truffle.

EXAMPLE 5

White truffle mycelium is cultivated as described in example 2 for 2 months till an important biomass is reached. The mycelium is then ground with a sterile mixer and transferred in an air tight container containing either pure malt extract or malt extract that have been supplemented with the following compounds (amino acids: L-methionine; leucine, isoleucine, valine, phenylalanine and as negative control: cysteine; or with 2-oxo-4-methylthiobutyric acid, degradation product of L-methionine. The concentration of these compounds is comprised between 1 mM and 400 mM as displayed in Table 1.

The mycelium is grown on these various media and after 2 weeks the sensory characteristics of each cultures (smell) is evaluated by a panel of experts.

The sensory analysis results are described in Table 1.

To the nose, the mycelium grown on malt extract (unsupplemented with amino acids) produces a smell of "malt and mushroom" (Table 1).

Cysteine which serves here as a negative control does not induce any truffle aroma.

Other amino acids (L-methionine, valine, leucine, isoleucine, phenylalanine) and the degradation product of L-methionine, 2-oxo-4-methylthiobutyric acid, induce characteristic truffle aroma only if they are present at concentrations that are much higher than their natural concentration in malt extract. These concentrations vary depending on the aroma precursors (amino acids or degradation products) and are comprised between 10 mM and 400 mM according to Table 1.

TABLE 1

Results of the sensory analysis

| Amino acids concentration supplemented to Malt Extract | Excess compared to Malt Extract | Aroma Description | Similar to truffle aroma? (— = no; ✓ = yes) |
|---|---|---|---|
| Pure Malt Extract | | | |
| 0 mM | 0 | malt, mushroom | — |
| Cysteine (negative control) | | | |
| 1 mM | 140 | malt, mushroom | — |
| 10 mM | 1400 | malt, mushroom | — |
| 50 mM | 7000 | malt, mushroom | — |
| 100 mM | 14000 | malt, mushroom | — |
| 200 mM | 28000 | malt, mushroom | — |
| 400 mM | 42000 | malt, mushroom | — |
| L-Methionine | | | |
| 1 mM | 100 | malt, mushroom | — |
| 10 mM | 1000 | slight sulfurous notes | — |
| 50 mM | 5000 | cabbage, rotten egg | ✓ |
| 100 mM | 10000 | intense cabbage, garlic | ✓ |
| Leucine | | | |
| 1 mM | 30 | malt, mushroom | — |
| 10 mM | 260 | malt, mushroom | — |
| 50 mM | 1300 | whisky | — |
| 100 mM | 2600 | whisky with smokey notes | ✓ |
| 200 mM | 5200 | whisky with smokey notes, intense | ✓ |
| Isoleucine | | | |
| 1 mM | 50 | malt, mushroom | — |
| 10 mM | 500 | malt, mushroom | — |
| 50 mM | 2500 | malt, mushroom | — |
| 100 mM | 3000 | pungent, fruity | ✓ |
| 200 mM | 6000 | pungent, fruity | ✓ |
| Valine | | | |
| 1 mM | 30 | malt, mushroom | — |
| 10 mM | 300 | pungent, low intensity | — |
| 50 mM | 1500 | pungent, acrid | ✓ |
| 100 mM | 3000 | pungent, acrid | ✓ |
| 200 mM | 6000 | pungent, acrid | ✓ |
| 400 mM | 12000 | pungent, acrid, intense | ✓ |
| Phenylalanine | | | |
| 1 mM | 50 | mushroom, very slight rose aroma | — |
| 10 mM | 500 | rose, low intensity | ✓ |
| 50 mM | 2400 | rose, intense | ✓ |
| 100 mM | 4800 | rose, intense | ✓ |
| 2-oxo-4-methylthiobutyric acid (degradetion product of L-methionine) | | | |
| 1 mM | — | slight sulfurous aroma | — |
| 10 mM | — | cabbage, rotten egg | ✓ |
| 50 mM | — | intense cabbage, garlic | ✓ |

REFERENCES

Delmas M, Gaset A, Montant C, Pebeyre J P, Talon T (1986) Procédé de fabrication d un produit aromatique à odeur et goût de truffe noire, produit et Corps aromatisés obtenus. Demande de brevet francais FR 86 10871 et demande de brevet Europeen No EP 0257666.

IT 1215936B (SENTOSA S. A. S MILANO)

Fauconnet C, Delher G (1998) Influence des facteurs climatiques sur la production des truffes en Quercy. Le Truffi-culteur Français 24(3):19-21.

Fields B (1997) Meet the professor. Local flavor. November 2007 pp 32-33.

Flückiger-Isler R, Mörikofer-Zwez S, Kahn J M, Walter P (1994). Dietary components of malt extract such as maltodextrins, proteins and inorganic salts have distinct effects on glucose uptake and glycogen concentrations in rats. The Journal of Nutrition pp 1647-1653

Hall I, Yun W (2001) Truffles and other edible mycorrhizal mushrooms-some new crops for the Southern Hemisphere. Edible Mycorrhizal Mushrooms and their cultivation. Hall I, Yun W, Danell E, Zambonelli A (eds). Proceedings of the second International Conference on Edible Mycorrhizal Mushrooms. New Zealand. pp 1-7.

Splivallo R, Bossi S, Maffei M, Bonfante P (2007a) Discrimination of truffle fruiting body versus mycelial aromas by stir bar sorptive extraction. Phytochemistry 68: 2584-98.

Tirillini B, Verdelli G, Paolocci F, Ciccioli P, Frattoni M (2000) The volatile organic compounds from the mycelium of *Tuber borchii* Vitt. Phytochemistry 55:983-985.

Barbieri et al, <<Phylogenetic Characterization and In Situ Detection of a *Cytophaga-Flexibacter-Bacteroides* Phylogroup Bacterium in *Tuber borchii* Vittad. Ectomycorrhhizal Mycelium>> Applied and Environmental Microbiology, November 2000, Vol. 66, No. 11, p. 5035-5042; <<New evidence for bacterial diversity in the ascoma of the ectomycorrhizal fungus *Tuber borchii* Vittad.>> FEMS Mircobiology Letters 247 (2005) 23-25; and <<Occurrence and diversity of bacterial communities in *Tuber magnatum* during truffle maturation>> Environmental Microbiology (2007) 9(9), 2234-2246.

The invention claimed is:

1. A method for the production of truffle aroma, the method comprising
   supplementing at least one aroma precursor to a culture medium comprising a cultivated truffle mycelium to produce the truffle aroma,
   wherein said aroma precursor is selected from the group consisting of L-methionine, leucine, isoleucine, valine, phenylalanine, α-ketoglutarate, 3-phosphoglycerate, oxaloacetate, pyruvate, phosphoenolpyruvate, erythrose 4-phosphate, ribose 5-phosphate, 2-oxo-4-methylthiobutyric acid, 4-methylpentanoic acid, 3-methylpentanoic acid, 3-methylbutanoic acid, and 3-phenylpropanoic acid,
   and wherein the cultivated truffle mycelium belongs at a species selected from the group consisting of *Tuber melanosporum, Tuber magnatum, Tuber æstivum, Tuber uncinatum, Tuber brumale, Tuber borchii, Tuber mesentericum*, and *Tuber indicum*,
   and wherein said aroma precursor is present in the culture medium in an amount higher or equal to a concentration of 10 mM.

2. The method of claim 1, wherein said aroma precursor supplemented to the truffle mycelium culture medium is present at a concentration between 10 and 1000 mM.

3. The method of claim 2, wherein the aroma precursor supplemented to said truffle mycelium culture medium is present at a concentration between 10 and 500 mM.

4. The method of claim 1, wherein L-methionine or valine supplemented to said truffle mycelium culture medium are present at a concentration higher or equal to 50 mM.

5. The method of claim 1, wherein leucine or isoleucine supplemented to said truffle mycelium culture medium are present at a concentration higher or equal to 100 mM.

6. The method of claim 1, wherein phenylalanine or 2-oxo-4-methylthiobutyric acid, supplemented to said truffle mycelium culture medium are present at a concentration higher or equal to 10 mM.

7. The method of claim 1, wherein the amino acids are selected from the group consisting of L-methionine and isoleucine.

8. The method of claim 1, wherein the cultivated truffle mycelium further contains bacteria and/or yeasts which are naturally associated with truffle fruiting bodies.

9. The method of claim 1, wherein truffle mycelia are cultivated with at least one aroma precursor and maintained in culture for at least 7 days at a temperature between 10 to 30° C.

10. The method of claim 9, wherein the culture temperature is comprised between 15 and 20° C.

11. The method of claim 1, wherein the natural truffle aroma is a volatile compound which includes dimethylsulfide, dimethyldisulfide, dimethyltrisulfide, 2-methylbutanal, 2-methylpropanal, 3-methylbutanal, 2-phenylethanol, 2,4-dithiapentane, 1-octen-3-ol, 3-octanone, their oxidized or reduced derivatives and/or their mixtures.

12. The method of claim 1, wherein said aroma precursor supplemented to said truffle mycelium culture medium further comprises linoleic acid.

* * * * *